United States Patent
Tunnicliffe et al.

(10) Patent No.: US 10,698,791 B2
(45) Date of Patent: Jun. 30, 2020

(54) HANDLING REQUEST DATA WITH TYPE SAFETY IN A REMOTE SERVICE

(71) Applicant: INTERNATIONAL BUSINESS MACHINES CORPORATION, Armonk, NY (US)

(72) Inventors: Michael J. Tunnicliffe, Southampton (GB); Christopher N. Bailey, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 16/048,258

(22) Filed: Jul. 28, 2018

(65) Prior Publication Data

US 2020/0034272 A1 Jan. 30, 2020

(51) Int. Cl.
*G06F 9/44* (2018.01)
*G06F 11/36* (2006.01)
(Continued)

(52) U.S. Cl.
CPC ............ *G06F 11/3616* (2013.01); *G06F 8/36* (2013.01); *G06F 11/004* (2013.01); *G06F 21/577* (2013.01); *H04L 67/34* (2013.01)

(58) Field of Classification Search
CPC ...... G06F 11/004; G06F 11/3616; G06F 8/36; G06F 21/577; H04L 67/34
(Continued)

(56) References Cited

U.S. PATENT DOCUMENTS 7,350,198 B2 * 3/2008 Kluger ................... G06F 8/31
717/140
7,353,501 B2 * 4/2008 Tang .................. G06F 11/3624
712/224

(Continued)

FOREIGN PATENT DOCUMENTS

WO     2002001356 A9    12/2002

OTHER PUBLICATIONS

"Exploring the Scala Macro System for Compile Time Model-Based Generation of Statically Type-Safe REST Services"; Filipe R. R. Oliveira—Faculdade De Engenharia Da Universidade Do Porto; Jul. 2015.*

(Continued)

*Primary Examiner* — Francisco J Aponte
(74) *Attorney, Agent, or Firm* — L. Jeffrey Kelly (57) ABSTRACT

Method and system are provided for handling request data with type safety in a remote service. The method includes providing a data structure, the data structure comprising a set of entries, each entry matching an incoming request type with a function for handling the request, the function defining a set of parameters. The method includes receiving an incoming request for a service from a remote client, wherein the request includes request data. The method includes using the data structure and identifying an entry for the incoming request by matching the request data to an incoming request type of an entry. The method includes converting the incoming request into a set of parameters using a software construct of the matching function identified in the entry, wherein the software construct comprises the matching function and associated in-scope local variables; and running the function using the converted parameters.

18 Claims, 6 Drawing Sheets

(51) Int. Cl.
*G06F 8/36* (2018.01)
*G06F 21/57* (2013.01)
*G06F 11/00* (2006.01)
*H04L 29/08* (2006.01)

(58) Field of Classification Search
USPC .......................................................... 717/126
See application file for complete search history.

(56) References Cited

U.S. PATENT DOCUMENTS

| | | | | |
|---|---|---|---|---|
| 7,512,957 | B2* | 3/2009 | Cohen | G06F 9/547 |
| | | | | 719/328 |
| 7,827,197 | B2* | 11/2010 | Scheuerle, Jr. | G06F 8/70 |
| | | | | 707/791 |
| 7,860,894 | B2 | 12/2010 | Rohwedder et al. | |
| 8,191,038 | B1* | 5/2012 | Samuel | G06F 16/972 |
| | | | | 717/106 |
| 8,302,017 | B2* | 10/2012 | Kim | H04L 69/06 |
| | | | | 707/804 |
| 9,015,682 | B1* | 4/2015 | Hjelmstad | G06F 9/545 |
| | | | | 717/145 |
| 9,495,342 | B2* | 11/2016 | Lawrance | G06F 17/24 |
| 9,652,314 | B2* | 5/2017 | Mahiddini | G06F 9/547 |
| 10,015,264 | B2* | 7/2018 | Lancaster | H04L 67/2804 |
| 10,019,259 | B2* | 7/2018 | Araya | G06F 8/76 |
| 10,078,580 | B2* | 9/2018 | Nandakumar | G06F 8/65 |
| 10,203,940 | B2* | 2/2019 | Hodaei | G06F 8/437 |
| 10,423,397 | B2* | 9/2019 | Noonan | G06F 8/437 |
| 2001/0039653 | A1* | 11/2001 | Egashira | G06F 8/4442 |
| | | | | 717/160 |
| 2004/0210881 | A1* | 10/2004 | Friedman | G06F 8/00 |
| | | | | 717/140 |
| 2005/0097530 | A1* | 5/2005 | Asao | G06F 8/41 |
| | | | | 717/140 |
| 2005/0273772 | A1* | 12/2005 | Matsakis | G06F 8/41 |
| | | | | 717/136 |
| 2006/0150146 | A1* | 7/2006 | Meijer | G06F 9/4492 |
| | | | | 717/108 |
| 2006/0242187 | A1 | 10/2006 | Scharf | |
| 2008/0086682 | A1* | 4/2008 | Derricott | G06F 16/116 |
| | | | | 715/239 |
| 2009/0192847 | A1* | 7/2009 | Lipkin | G06F 9/468 |
| | | | | 726/4 |
| 2011/0258593 | A1* | 10/2011 | Ng | G06F 8/437 |
| | | | | 717/106 |
| 2012/0005660 | A1* | 1/2012 | Goetz | G06F 8/437 |
| | | | | 717/140 |
| 2014/0130016 | A1* | 5/2014 | Menghrajani | G06F 11/3604 |
| | | | | 717/124 |
| 2014/0282441 | A1* | 9/2014 | Hoban | G06F 8/437 |
| | | | | 717/141 |
| 2014/0282442 | A1* | 9/2014 | Hoban | G06F 8/437 |
| | | | | 717/143 |
| 2014/0282443 | A1* | 9/2014 | Hoban | G06F 8/437 |
| | | | | 717/143 |
| 2019/0098106 | A1* | 3/2019 | Mungel | H04L 67/2838 |
| 2019/0354414 | A1 | 11/2019 | Bailey | |

OTHER PUBLICATIONS

"Statically Checking Web API Requests in JavaScript"; Erik Wittern, Annie T. T. Ying, Yunhui Zheng, Julian Dolby, Jim A. Laredo; IBM T. J. Watson Research Center, Yorktown Heights, NY, USA—2017 IEEE.*

Zárybnický Jakub; "A Haskell Platform for Creating Progressive Web Applications"—Brno University of Technology, Department of Intelligent Systems; May 15, 2019.*

Arjan Oortgiese et al. "A Distributed Dynamic Architecture for Task Oriented Programming"; IFL 2017, Aug. 30-Sep. 1, 2017, Bristol, United Kingdom.*

Anton Ekblad; "A Meta-EDSL for DistributedWeb Applications"; Haskell'17, Sep. 7-8, 2017, Oxford, UK.*

Beatriz A. Sanchez et al.; "RestMule: Enabling Resilient Clients for Remote APIs"; 2018 ACM/IEEE 15th International Conference on Mining Software Repositories.*

Rudi Grinberg; "Type Safe Routing—Baby Steps",' Dec. 13, 2014. http://rgrinberg.com/posts/primitive-type-safe-routing/.*

Steve Fenton; "Pro TypeScript: Application-Scale JavaScript Development";Basingstoke, United Kingdom—2018.*

Anton Ekblad et al.; "A Seamless, Client-Centric Programming Model for Type Safe Web Applications"; Chalmers University of Technology; Haskell '14, Sep. 4-5, 2014, Gothenburg, Sweden.*

Grace Period Disclosure, IBM-Swift/Kitura, V2.0.0 released on Oct. 27, 2017, https://github.com/IBM-Swift/Kitura/releases/tag/2.0.0, p. 1 of 1.

Lumpp, "Using TypeConverters in Web API", Development (http://blog.karbyn.com/category/development/), Jan. 11, 2018, pp. 1-6.

Mell et al., "The NIST Definition of Cloud Computing", National Institute of Standards and Technology, Special Publication 800-145, Sep. 2011, pp. 1-7.

https://rocket.rs/overview/, "Overview—A Brief Look at What Makes Rocket Special", Jan. 11, 2018, pp. 1-2.

Pending U.S. Appl. No. 16/140,807, filed Sep. 25, 2018, entitled: "Dynamically Switchable Transmission Data Formats in a Computer System", 47 pages.

* cited by examiner

HANDLING REQUEST DATA WITH TYPE SAFETY IN A REMOTE SERVICE

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM® Swift, Kitura Version 2.0, made available to the public on Oct. 27, 2017. The following disclosure is submitted under 35 U.S.C. § 102(b)(1)(A).

BACKGROUND

The present invention relates to handling request data in a remote service, and more specifically, to handling request data with type safety in remote services such as microservices or web applications. Remote services such as microservices and web applications provide exposed web application programming interfaces (APIs) that allow the remote services to be invoked (i.e., called) by remote users (i.e., callers) or other microservices and web applications. APIs may be provided for protocols such as representational state transfer (REST), remote procedure calls (gRPC) and streaming text-oriented messaging protocol (STOMP).

SUMMARY

According to an aspect of the present invention there is provided a computer-implemented method for handling request data with type safety in a remote service. The present invention may include providing a data structure, wherein the data structure includes a set of entries, wherein each entry matches an incoming request type with a function for handling the request, and wherein the function defines a set of parameters. The present invention may also include receiving an incoming request for a service from a remote client, wherein the request includes request data. The present invention may then include using the data structure to identify an entry for the incoming request by matching the request data to an incoming request type of an entry The present invention may further include converting the incoming request into a set of parameters using a software construct of the matching function identified in the entry, wherein the software construct comprises the matching function and associated in-scope local variables. The present invention may also include running the function using the converted parameters.

According to another aspect of the present invention there is provided a system for handling request data with type safety in a remote service. The present invention may include a processor and a memory configured to provide computer program instructions to the processor to execute the function of the components. The present invention may also include a data structure providing component for providing a data structure, wherein the data structure includes a set of entries, wherein each entry matches an incoming request type with a function for handling the request, and wherein the function defines a set of parameters. The present invention may then include an incoming request component for receiving an incoming request for a service from a remote client, wherein the request includes request data; a data structure entry identifying component for identifying an entry in the data structure for the incoming request by matching the request data to an incoming request type of an entry. The present invention may further include a request parameter converting component for converting the incoming request into a set of parameters using a software construct of the matching function identified in the entry, wherein the software construct comprises the matching function and associated in-scope local variables. The present invention may also include a function running component for running the function using the converted parameters.

According to a further aspect of the present invention there is provided a computer program product for handling request data with type safety in a remote service. The present invention may include a computer readable storage medium having program instructions embodied therewith and the program instructions executable by a processor to cause the processor to provide a data structure, wherein the data structure includes a set of entries, wherein each entry matches an incoming request type with a function for handling the request, and wherein the function defines a set of parameters. The present invention may also include receiving an incoming request for a service from a remote client, wherein the request includes request data. The present invention may further include using the data structure to identify an entry for the incoming request by matching the request data to an incoming request type of an entry. The present invention may then include converting the incoming request into a set of parameters using a software construct of the matching function identified in the entry, wherein the software construct comprises the matching function and associated in-scope local variables. The present invention may also include running the function using the converted parameters.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION

A method and system are provided for handling request data with type safety in a remote service. As previously stated, remote services such as microservices and web applications provide exposed web application programming interfaces (APIs) that allow the remote services to be invoked (i.e., called) by remote users (i.e., callers) or other microservices and web applications. APIs may be provided for protocols such as representational state transfer (REST), remote procedure calls (gRPC) and streaming text-oriented messaging protocol (STOMP).

The APIs and their remote users may be loosely coupled. The caller may be required to invoke the API using the correct protocol with the correct data, and the callee may be expected to validate the data and reject the request if it is found to be invalid. Additionally, the callee may then transform the data from the transmission format into native data structures understood by the programming language used for the microservice.

This may differ from typical calling conventions for APIs in programming languages when the data is already in the correct format and the API definition itself is used to validate that the caller is calling it correctly, either by the language compiler during development or by the language runtime on execution. The use of loose coupling puts significant effort onto the programmer to develop code that correctly validates and transforms the data in order to avoid bugs and expose security vulnerabilities.

There is an increased use of microservices, which require increasingly complex APIs and the transmission of more complex data. For example, the use of JavaScript® Object Notation (JSON) (JavaScript and all JavaScript-based trademarks and logos are trademarks or registered trademarks of Oracle Corporation and/or its affiliates) as the standard for the data format of the body request data is now being replaced with more compressed, strongly-typed formats such as remote procedure calls and protocol buffers.

A number of attempts have been made to provide "type safe routing" by frameworks that do some form of conversion, and therefore validation, of the incoming API request data. However, each of these is limited in that they only deal with Uniform Resource Locator (URL) encoded parameters. For example, values that are embedded in the URL request itself such as /hello/{x}/from/{y}, where x and y are parameters. Here it is guaranteed that the incoming parameters are strings, and therefore can be converted to any "type" that already supports construction from a string or that can easily have a string constructor added.

Figure 1:
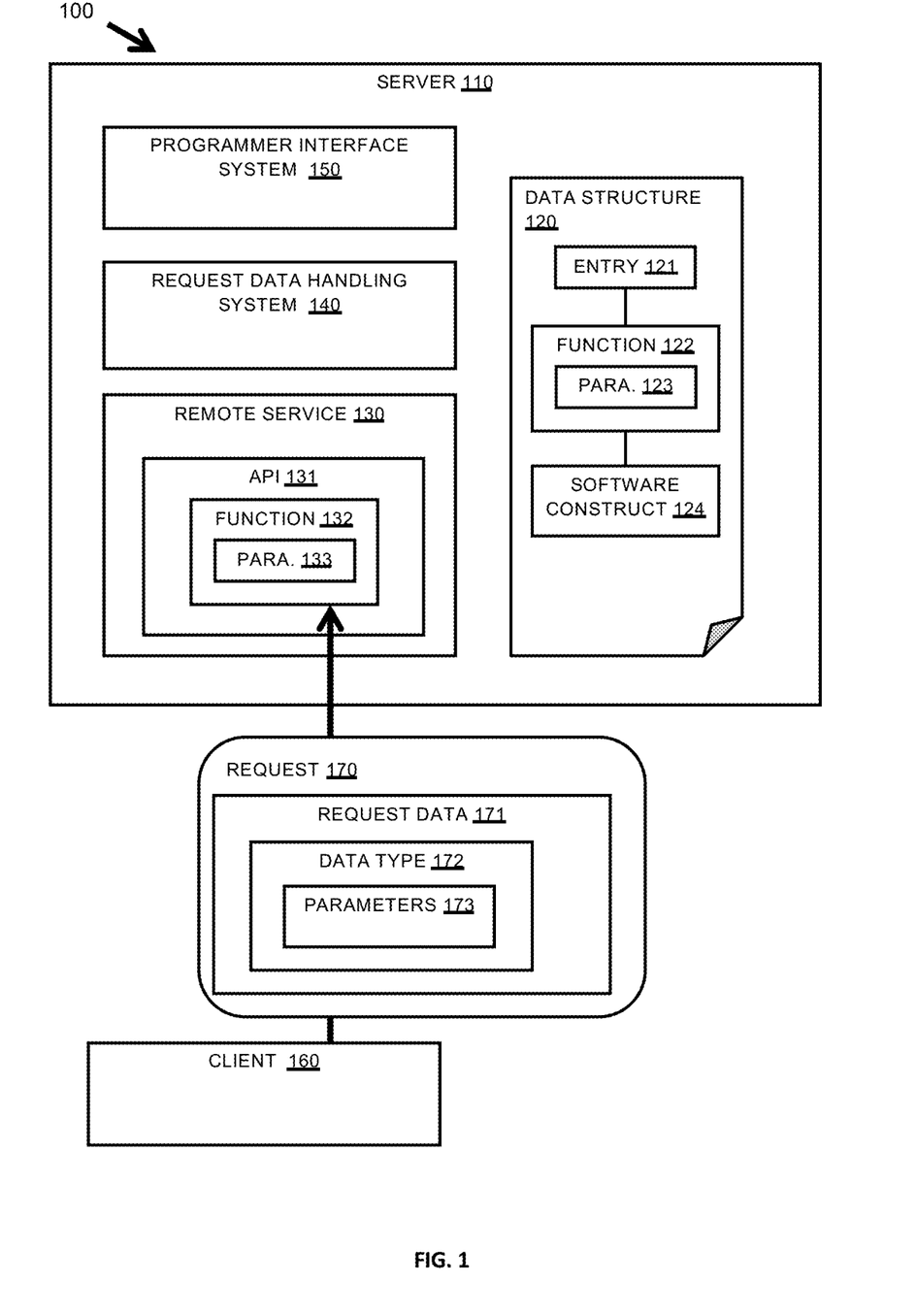
FIG. 1 is a block diagram of an example embodiment of a system in accordance with the present invention.

Referring to FIG. 1, a block diagram 100 illustrates an example embodiment of the described system.

A server 110 may provide a remote service 130 to clients 160, for example, the remote service 130 may be a microservice or a web application. Remote services 130 may expose application programming interfaces (APIs) 131 that are invoked by remote clients 160 or by other remote services.

The exposed APIs 131 may be increasingly complex and the APIs 131 may only be loosely coupled with the API callers. The caller may be required to invoke the API 131 by using the correct protocol and with the correct data, then the remote service 130 must validate the data and reject a request 170 if the data is not valid.

Use of loose coupling may put a significant amount of effort onto the programmer of remote services 130 to develop code that correctly validates and transforms the data in order to avoid bugs and expose security vulnerabilities.

Requests 170 sent by clients 160 using the remote service 130 may include request data 171 that is complex and may be in compressed into strongly-typed formats such as remote procedure calls (e.g., gRPC) and protocol buffers. The request data 171 may include data types 172 with parameters 173 of the data types.

A data type is a classification data that may indicate how the data will be used. Most programming languages support various types of data, for example, real, integer or Boolean. A data type provides a set of values from which an expression (i.e., variable, function) may take its values. This data type may define the operations that can be done on the data, the meaning of the data, and the way values of that type can be stored.

A strongly-typed programming language may be one in which each type of data (e.g., an integer, a character, a hexadecimal or a packed decimal) is predefined as part of the programming language and all constants or variables defined for a given program must be described with one of the data types.

The described method and system may add support for type conversion and validation of the request data 171 in a request 170 from a client 160. This is particularly applicable to loosely coupled implementations using strongly-typed data.

The described system may provide a programmer interface system 150 for adding functions to a data structure 120 as required for functions 132 with parameters 133 of exposed APIs 131 of the remote service 130.

The described system may also provide a request data handling system 140 for handling incoming requests 170 to a remote service 130 from clients 160 at run time using the data structure 120.

The data structure 120 may be provided in the form of a router table with a set of entries 121 and programmer-defined functions 122 defining a set of parameters 123. Each entry 121 may match an incoming request type 172 with a programmer-defined function 122 for handling the request 170. Each entry 121 may relate to a same type and each function 122 and may have the same function signature. Each function 122 may be a reusable function that has a software construct 124 for handling each function 122. The software construct 124 may include the matching function 122 and may be associated with in-scope local variables. The function 122 may be provided as a template for creating specialized functions at compile time that apply the concrete types used by callers.

The request data handling system 140 may convert incoming request data 171 by using the software construct 124 of a function 122 for a data type 172 to convert the request data 171 parameters 173 for running in a function 132 of the API 131 of the remote service 130.

Figure 2:
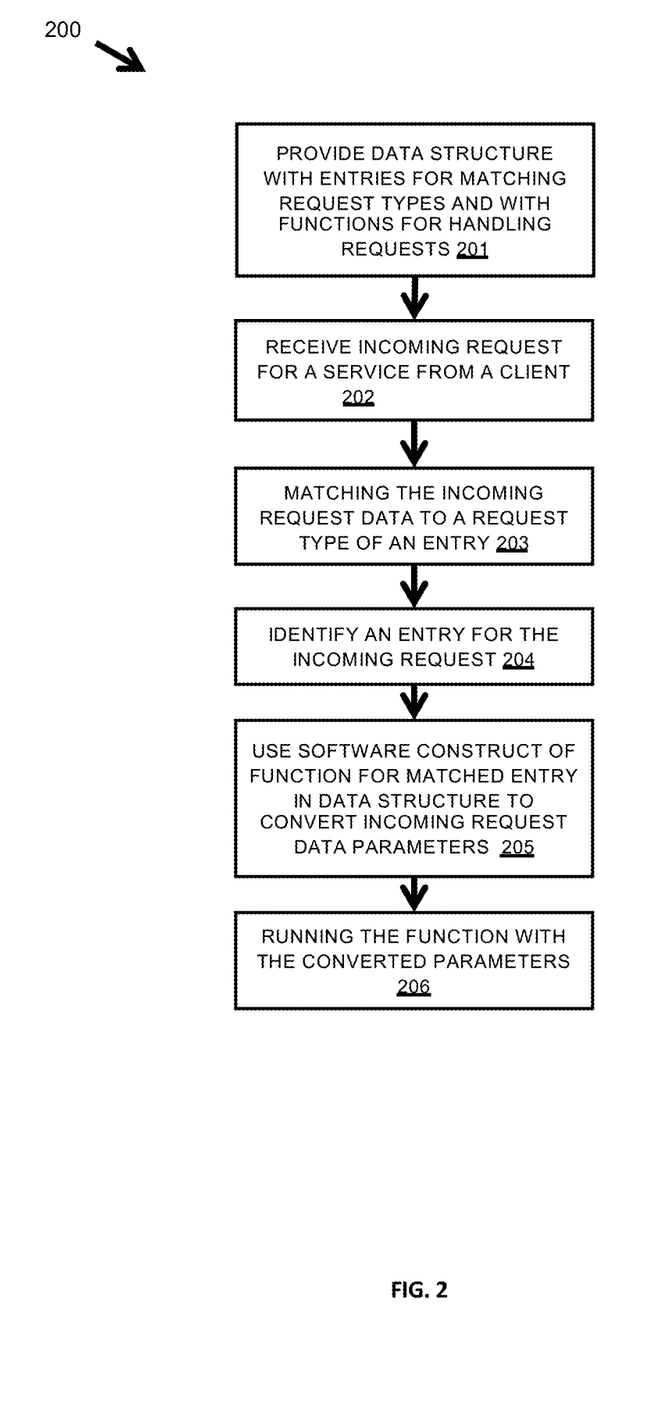
FIG. 2 is a flow diagram of an example embodiment of a method in accordance with the present invention.

Referring to FIG. 2, a flow diagram 200 presenting an example embodiment of the described method of handling request data with type safety in a remote service.

At 201, the method may provide a data structure having a set of entries. Each entry matches an incoming request type with a user-created function for handling the request and each entry matches the function defining a set of parameters. Each entry may also relate to a same type and each function may have the same function signature.

Then, at 202, the method may receive an incoming request for the remote service from a remote client. The request may contain request data including a data type having parameters.

At 203, the method may match the request data to an incoming request data type of an entry in the data structure. At 204, the method may identify an entry for the incoming request. The mapping of the request data and the identification of an entry may map to a matching function having a software construct identified in the data structure.

At 205, the method may convert the incoming request into a set of parameters using the software construct of the matching function. The software construct may include a matching function and associated in-scope local variables and may be a closure wrapping the programmer-define function stored data types.

Then, at 206, the method may run the function using the converted parameters, thereby ensuring type safety of the request data.

The described method and system may address the particular challenges to be overcome for strongly-typed languages, specifically avoiding the loss of type information. For example, a programmer of a remote service may register an exposed API that requests the body data to be converted to a specific type as shown below.

```
Router.add("POST:/api/v2/updateUser", User.self) { user in
  updateInDatabase(user)
}
```

The "User" structure may inherit from a specific type or implement a specific interface. The programmer may then request to be passed as a parameter into the provided function or closure (e.g., "Convertable").

This API may then be stored, and subsequently called when a caller makes a call that matches the API, for example:

a POST request to "/api/v2/updateUser".

However, this may pose a problem. First, the Router.add( ) function needs to be declared such that it accepts specific known types that it can be called with (i.e., RequestConvertable). Second, the collection the API is stored in also needs to be declared such that it stores specific known types (i.e., RequestConvertable).

At this point the strongly-typed information has been lost (i.e., type erased) and replaced with RequestConvertable, and as such, the strongly-typed information is the only type that can be passed into the function provided by the programmer.

The described method provides a mechanism for allowing programmers to specify the concrete types of the body data that are accepted as part of the request from the caller and for the body data that is returned as part of the response from the callee, avoiding the problems related to type erasure. A solution is provided regarding the loss of type information when implementing type conversion and when validating the request and response body data.

The mechanism centers around two approaches. The first approach may use generics or templates to define the router functions that a programmer can use to register an API. The second approach may use a software construct such as a closure wrapper around the programmer provided function that carries out the conversion of the body data. These combined approaches may allow the information on the types to be used for the request and response body to be stored in the closure rather than as parameters, removing the need for the information on the types to be used as parameters and, therefore, type loss.

Generics may allow reusable functions to be defined that work with any types, with the optional ability to apply constraints on the types of data that the function will work with. Typically, the compiler may use this as a template and create multiple specialized functions at compile time that apply the concrete types used by callers in the application.

Generics may allow reusable functions to be defined that work with any types. An example may include the function below.

```
func <T> myFunction(param: T) {
  ...
}
```

Here the generic placeholder 'T' can be of any type. Additionally constraints may be placed on 'T' to limit which types are allowed, for example:

```
func <T: Codable> myFunction(param: T) {
  ...
}.
```

The above function applies a constraint that the placeholder 'T' can only be used for types that implement Codable, which may allow APIs of the constrained specialized types to be used inside the function at a generic level. However, those generics may be converted to concrete types at compile time that retain the critical type information, for example:

```
func add<I: Codable, O: Codable>(_route: String, input: I.Type,
  output: O.Type,
  handler: @escaping I -> O) {
  let data = {encoded data}
  let param = try decoder.decode(I.self, from: data)
  let result = try handler(param)
  return try encoder( ).encode(result)
}.
```

The above function may require the input and output types to conform to "Codable", which enables encode( ) and decode( ) to be called on it, but may retain the concrete type information when the generic function is converted into concrete functions by the compiler.

A limitation may occur when, for example, a programmer registers the contents of the generic function and rather than executing the contents, the generic function may need to be stored so that the generic function may be called from an incoming request. The results of the limitation may include a type loss during storage.

Therefore, a closure may be used to wrap the programmer's function and allow the knowledge of the concrete types requested by the programmer to be held in the closure rather than as parameters, which would then lose their types as they are stored. The wrapping closure then may only need to accept the incoming request body as data and only needs to return the response body data.

A closure (i.e., a lexical closure or a function closure) may include a technique for implementing lexically scoped name binding in a language with first-class functions. Operationally, a closure may be a record storing a function together with an environment. The environment may be a mapping associating each free variable of the function (i.e., variables that are used locally, but defined in an enclosing scope) with the value or reference to which the name was bound when the closure was created. A closure, unlike a plain function, may allow the function to access those captured variables through the closure's copies of their values or references, even when the function is invoked outside their scope.

Taking this approach results in the following code:

```
typealias CodableClosure<I: Codable,O: Codable> = (I) throws -> O
func add<I: Codable, O: Codable>(_route: String, codableHandler:
@escaping CodableClosure<I, O>) {
let invoker: (Data) throws -> Data = { data in
let param = try JSONDecoder( ).decode(I.self, from: data)
let result = try codableHandler(param)
return try JSONEncoder( ).encode(result)
}
codableRoutes.append((route, invoker));
}.
```

The above function may allow the router and the wrapper closure to be stored as they have consistent types, delegating the conversion between the programmer's requested concrete types and the request/response body data to the wrapping closure, which can store the type data as part of its own code.

This provides, for example, the programmer with a simple API interface that may require the programmer to use the following code to accept and return back the same "User" type data as shown below.

```
router.add("/users") { (user: User) -> User in
return user
}
```

This allows the framework to carry out the conversion and validation of the request body to the "User" type and to convert the "User" type into the response body.

Figure 3:
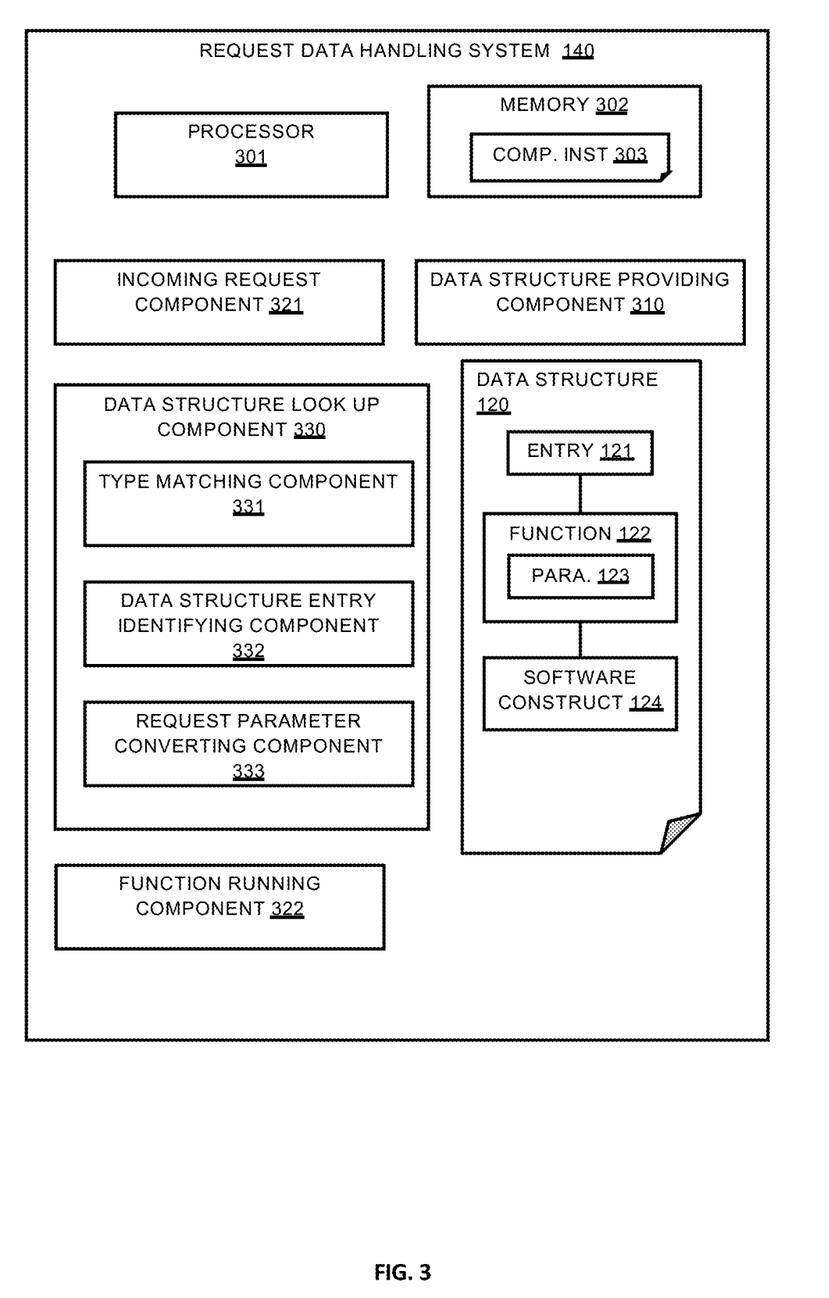
FIG. 3 is block diagram of an example embodiment of a system in accordance with the present invention.

Referring to FIG. 3, a request data handling system 140 may be provided on a server 110. The server 110 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The request data handling system 140 may include a data structure providing component 310 for providing a data structure 120. The data structure 120 may include a set of entries 121, each entry 121 matching an incoming request type with a function 122 for handling the request, the function 122 defining a set of parameters 123 and a software construct 124 for handling each function 122.

The request data handling system 140 may include an incoming request component 321 for receiving an incoming request for a service including request data from a remote client. The software construct 124 may comprise the matching function 122 and associated in-scope local variables.

The request data handling system 140 may include a data structure look up component 330 including a type matching component 331 and data structure entry identifying component 332 for identifying an entry 121 in the data structure 120 for the incoming request by matching the request data to an incoming request type of an entry 121. The data structure look up component 330 may include a request parameter converting component 333 for converting the incoming request into a set of parameters using the software construct 124 of the matching function identified in the entry.

The request data handling system 140 may also include a function running component 322 for running the function using the converted parameters.

Figure 4:
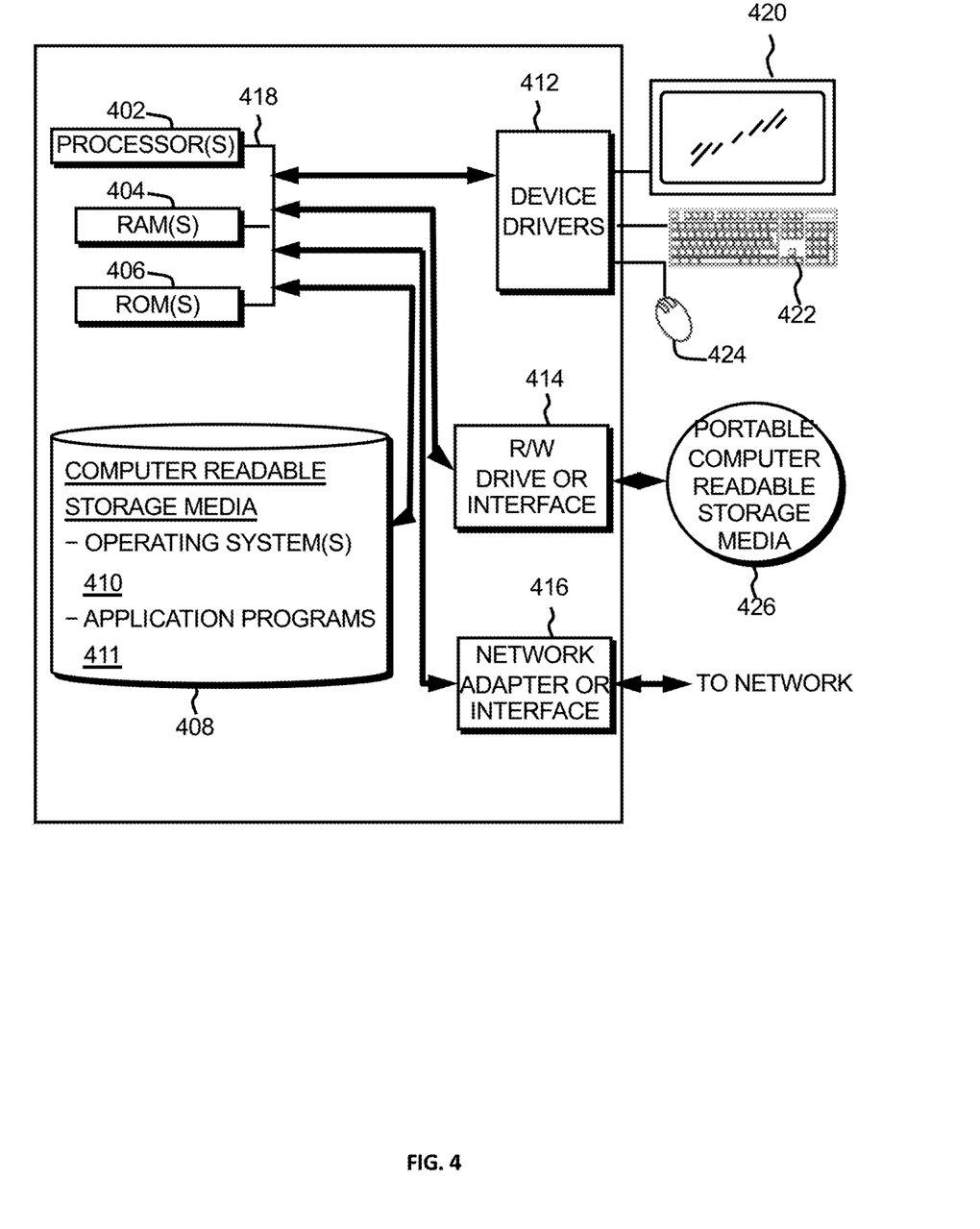
FIG. 4 is a block diagram of an embodiment of a computer system or cloud server in which the present invention may be implemented.

FIG. 4 depicts a block diagram of components of the computing device of the server 110 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411 such as the remote services 130 are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 414 to read from and write to one or more portable computer readable storage media 426. Application programs 411 on computing device can be stored on one or more of the portable computer readable storage media 426, read via the respective R/W drive or interface 414 and loaded into the respective computer readable storage media 408.

Computing device can also include a network adapter or interface 416, such as a TCP/IP adapter card or wireless communication adapter. Application programs 411 on computing device can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing device can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
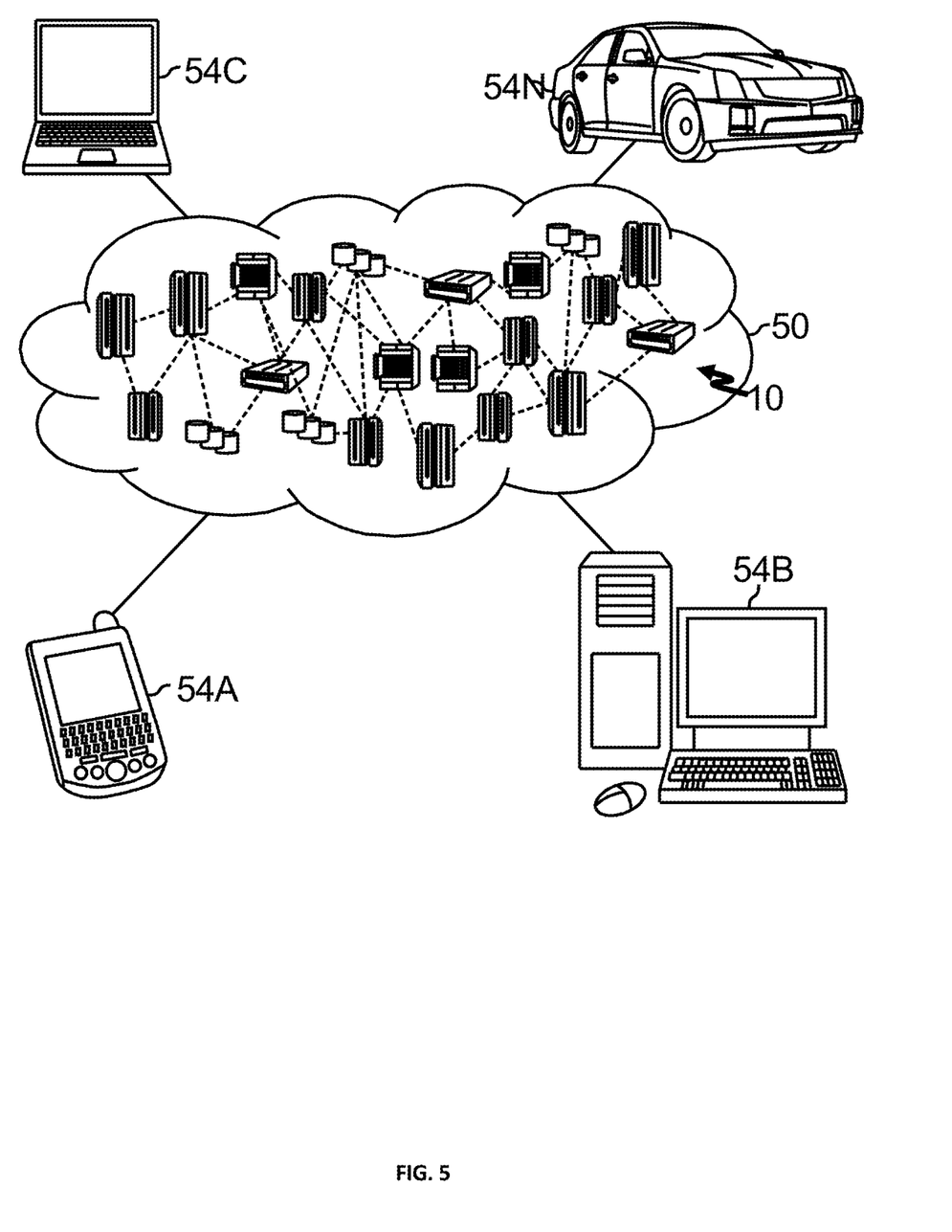
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
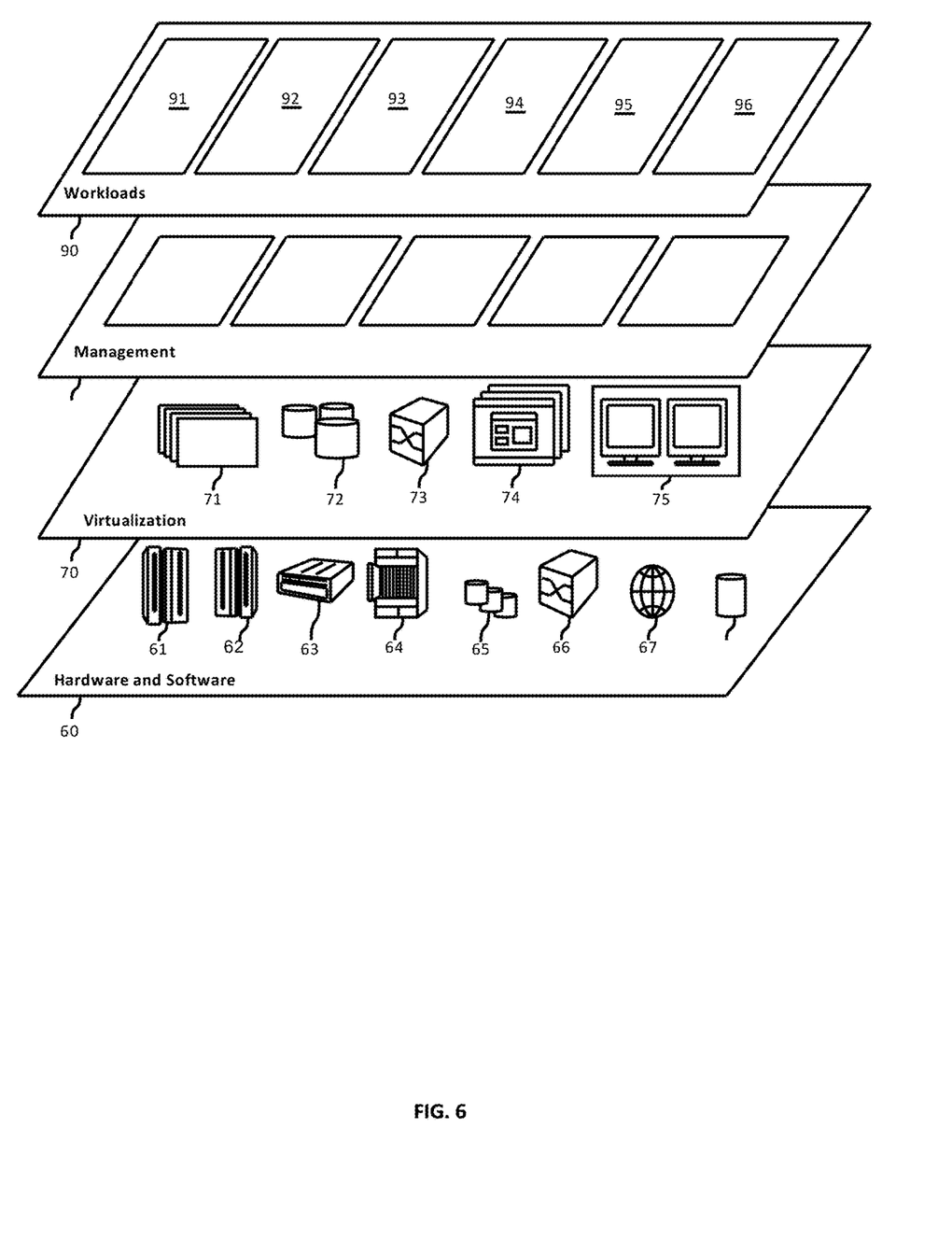
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and remote client request data handling processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for handling request data with type safety in a remote service, the method comprising:
   providing a data structure, wherein the data structure includes a set of entries, wherein each entry matches an incoming request type with a function for handling the request, and wherein the function defines a set of parameters;
   receiving an incoming request for a service from a remote client, wherein the request includes request data;
   using the data structure to identify an entry for the incoming request by matching the request data to an incoming request type of an entry;
   registering an entry in the data structure with a programmer-defined function for exposed application programming interfaces in the service;
   converting the incoming request into a set of parameters using a software construct of the matching function identified in the entry, wherein the software construct comprises the matching function and associated in-scope local variables, wherein the software construct is a closure wrapping the programmer-defined function, wherein the request data and the response are stored in the closure wrapping; and
   running the function using the converted parameters.

2. The method as claimed in claim 1, wherein the incoming request type of information is stored in the software construct.

3. The method as claimed in claim 1, wherein the closure carries out a conversion of request data that accepts an incoming request body of data and returns a response body of data as converted parameters for a data type.

4. The method as claimed in claim 1, wherein the data structure includes constraints on the types of data a function will work with.

5. The method as claimed in claim 1, wherein the functions of the data structure are generic functions defining reusable functions that work with data types.

6. The method as claimed in claim 1, wherein the software construct carries out a conversion between the programmer data types and the request body data, and wherein the software construct stores the type data as part of a software construct code.

7. The method as claimed in claim 1, wherein a compiler creates multiple specialized functions at compile time that apply the data types to be executed by requests in the service.

8. The method as claimed in claim 1, wherein the service is a remote service with exposed application programing interfaces (APIs).

9. The method as claimed in claim 8, wherein the remote service is a microservice or a web service.

10. A system for handling request data with type safety in a remote service, comprising:
    a processor and a memory configured to provide computer program instructions to the processor to execute the function of the components:
    a data structure providing component for providing a data structure, wherein the data structure includes a set of entries, wherein each entry matches an incoming request type with a function for handling the request, and wherein the function defines a set of parameters;
    an incoming request component for receiving an incoming request for a service from a remote client, wherein the request includes request data;
    a data structure entry identifying component for identifying an entry in the data structure for the incoming request by matching the request data to an incoming request type of an entry;
    the data structure registering an entry with a programmer-defined function for exposed application programming interfaces in the service;
    a request parameter converting component for converting the incoming request into a set of parameters using a software construct of the matching function identified in the entry, wherein the software construct comprises the matching function and associated in-scope local variables wherein the software construct is a closure wrapping the programmer-defined function, wherein the request data and the response are stored in the closure wrapping; and a function running component for running the function using the converted parameters.

11. The system as claimed in claim 10, wherein the incoming request type of information is stored in the software construct.

12. The system as claimed in claim 10, wherein the closure carries out a conversion of request data that accepts an incoming request body of data and returns a response body of data as converted parameters for a data type.

13. The system as claimed in claim 10, wherein the data structure includes constraints on the types of data a function will work with.

14. The system as claimed in claim 10, wherein the functions of the data structure are generic functions defining reusable functions that work with data types.

15. The system as claimed in claim 10, wherein the software construct carries out a conversion between the programmer data types and the request body data, and wherein the software construct stores the type data as part of a software construct code.

16. The system as claimed in claim 10, wherein a compiler creates multiple specialized functions at compile time that apply the data types to be executed by requests in the service.

17. The system as claimed in claim 10, wherein the service is a remote service with exposed application programing interfaces (APIs).

18. A computer program product for handling request data with type safety in a remote service, the computer program product comprising a computer readable storage medium having program instructions embodied therewith, the program instructions executable by a processor to cause the processor to:

provide a data structure, wherein the data structure includes a set of entries, wherein each entry matches an incoming request type with a function for handling the request, and wherein the function defines a set of parameters;

receive an incoming request for a service from a remote client, wherein the request includes request data;

use the data structure to identify an entry for the incoming request by matching the request data to an incoming request type of an entry;

use the data structure to register an entry with a programmer-defined function for exposed application programming interfaces in the service;

convert the incoming request into a set of parameters using a software construct of the matching function identified in the entry, wherein the software construct comprises the matching function and associated in-scope local variables, wherein the software construct is a closure wrapping the programmer-defined function, wherein the request data and the response are stored in the closure wrapping; and run the function using the converted parameters.

* * * * *